(12) United States Patent
Wu

(10) Patent No.: US 7,098,989 B2
(45) Date of Patent: Aug. 29, 2006

(54) LIQUID CRYSTAL DISPLAY ELEMENT WITH A DEFECT REPAIRING FUNCTION

(75) Inventor: Biing-Seng Wu, Tainan (TW)

(73) Assignee: Chi-Mei Optoelectronics Corp., (TW)

( * ) Notice: Subject to any disclaimer, the term of this patent is extended or adjusted under 35 U.S.C. 154(b) by 0 days.

(21) Appl. No.: 10/848,067

(22) Filed: May 19, 2004

(65) Prior Publication Data
US 2004/0212753 A1   Oct. 28, 2004

Related U.S. Application Data

(62) Division of application No. 09/789,591, filed on Feb. 22, 2001, now Pat. No. 6,753,935.

(30) Foreign Application Priority Data
Apr. 6, 2000   (TW)   ............... 89106351 A

(51) Int. Cl.
G02F 1/1343 (2006.01)
G02F 1/136 (2006.01)
G02F 1/1333 (2006.01)
G02F 1/1345 (2006.01)
G02F 1/13 (2006.01)

(52) U.S. Cl. .................... 349/192; 349/54; 349/55; 349/39; 349/42; 349/151; 257/66; 345/92

(58) Field of Classification Search ............... 349/192, 349/54, 55, 39, 42, 151; 257/66; 345/92
See application file for complete search history.

(56) References Cited

U.S. PATENT DOCUMENTS

| | | | | |
|---|---|---|---|---|
| 5,132,819 A * | 7/1992 | Noriyama et al. | ............ | 349/55 |
| 5,298,891 A | 3/1994 | Plus et al. | | |
| 5,337,173 A * | 8/1994 | Atsumi et al. | ............... | 349/39 |
| 5,825,438 A | 10/1998 | Song et al. | | |
| 6,011,277 A * | 1/2000 | Yamazaki | .................... | 257/66 |
| 6,191,832 B1 | 2/2001 | Nakakura | | |
| 6,300,977 B1 * | 10/2001 | Waechter et al. | ........... | 348/300 |
| 6,335,778 B1 * | 1/2002 | Kubota et al. | ............. | 349/151 |
| 6,411,347 B1 * | 6/2002 | Park et al. | .................... | 349/39 |
| 6,707,441 B1 * | 3/2004 | Hebiguchi et al. | ............ | 345/92 |
| 2002/0024493 A1 | 2/2002 | Ozawa et al. | | |

* cited by examiner

Primary Examiner—Huyen Ngo

(57) ABSTRACT

A liquid crystal display (LCD) element with a defect repairing function and a defect repairing method of the same. In an embodiment of the invention, a pixel is associated with a plurality of scan lines and a plurality of data lines. Along with separate spare lines, melting connection can be obtained to form a circuit path and to compensate for broken wires. A single pixel can also have a plurality of subpixels with spare conduction ports and meltable joints so that defective electrodes can be separated. The spare conduction ports can be melted and connected so that other subpixels support and compensate for the defective subpixel to minimize pixel signal loss.

4 Claims, 11 Drawing Sheets

LIQUID CRYSTAL DISPLAY ELEMENT WITH A DEFECT REPAIRING FUNCTION

RELATED APPLICATIONS

The present application is a divisional of U.S. application Ser. No. 09/789,591, filed Feb. 22, 2001 now U.S. Pat. No. 6,753,935, the entire disclosure of which is hereby incorporated by reference herein.

BACKGROUND OF THE INVENTION

1. Field of Invention

The present invention relates to a liquid crystal display (LCD) element and, in particular, to an LCD element with a defect repairing function. The invention also discloses a defect repairing method.

2. Related Art

With the merits of small volume and light weight, liquid crystal display (LCD) holds the edge in the market of portable display devices and smallspace application displays. Among all, the thin film transistor liquid crystal display (TFT-LCD) is the most favorable device. The device is using the field effect transistors to control the voltage applied to the liquid crystal film layer so as to control the orientation of liquid crystal molecules, thus adjusting the penetration of light through the liquid crystal layer. With the utilization of filters, a screen is able to display various colors and brightness.

FIG. 1A shows a standard circuit layout of a thin film transistor liquid crystal display (TFT-LCD) panel. A series of parallel scan lines 10 and a series of parallel data lines 20 are orthogonal to each other and not connected. They connect to a control electrode 12 and a control electrode 22, respectively, and separate the display panel into an array composed of pixels. Each pixel in the array has a field effect transistor (FET) 30, a liquid crystal capacitor 40 and a storage capacitor 50. Each FET has a gate, a drain and a source, wherein the gate connects to the corresponding scan line, and the drain connects to the corresponding data line. The liquid crystal capacitor 40 and the storage capacitor 50 are connected in parallel between the drain of the FET 30 and the ground.

In the conventional LCD elements, a detailed standard layout of each pixel is shown in FIG. 1B. The conduction areas 32, 34, 36 are the gate, source, and drain of the FET 30, respectively. The area 38 is the semiconductor channel of the transistor 30. The FET drain 36 connects to a transparent electrode plate 45, which functions simultaneously as the electrodes for the liquid crystal capacitor 40 and the storage capacitor 50. The transparent electrode plate 45 is usually made of indium tin oxide (ITO). A storage electrode plate 52 is installed underneath the transparent electrode plate 45 with a dielectric layer inserted between (not shown) so as to form a storage capacitor 50. The liquid crystal capacitor 40 is formed above the transparent electrode plate 45.

With the technology development of displays heading toward high screen quality and large sizes, manufacturers have to use narrower line width and smaller pixel sizes to make longer signal transmission lines (including scan lines and data lines) on the large-scale panels. Under this situation, such problems as uneven line width distribution and broken lines are likely to happen. It is also likely to have short circuits because of holes between separated electrodes, e.g., between the upper and lower electrode plates of the storage capacitor 50 (the transparent electrode plate 45 and the storage electrode plate 52), between the FET gate 32 and the source and drain 34, 36, or between channels 38. Broken signal lines will result in line defects since an entire row of pixels cannot receive control signals. Short circuits of electrode plates will cause point defects as the pixels cannot react to the voltage. Both of them have bad influence on the quality and the production yield of the display panels.

FIG. 2A shows a pixel array circuit for repairing line defects in the prior art. The basic circuit layout is the same as in FIG. 1A, except that the array border is surrounded with a spare line 80 over three sides. The spare line 80 is floating and striding over the data lines and scan lines, with a dielectric layer between. Its cross-sectional view is shown in FIG. 2B. The conduction layer 210 on the substrate 200 representing the signal lines 10 on the lower layer, and the conduction layer 230 representing the spare line 80 on the upper layer are segregated by a dielectric layer 220 inserted between. When no defect is detected in the display panel, the spare line is maintained in the default configuration. However, when one of the data lines is detected to have a line defect, i.e., the data line is broken because of discontinuity, then the spare line overlapping on the defective data line is melted (usually using a high energy laser) so that the conductive material can pass through the dielectric isolation layer to form a contact window 240 with the conductive wire on the lower layer. When both ends of the defective data line are connected to the conduction layer 210 by melting, the spare line 80 can replace the broken data line and transmit control signals to transistors.

Nevertheless, this line defect repairing design still has its drawbacks. The spare line is so long and strides over so many data lines and scan lines that parasitic capacitance effect occurs during the control signal transmission. The signal received by the transistors will be decreased and seriously distorted, resulting in bad screen images. In addition, this surrounding spare line design cannot repair multiple defects, such as line defects indicated above. To further increase the product quality and manufacturing yield and to control production costs, it is crucial to develop a better defect repairing method.

SUMMARY OF THE INVENTION

In view of the foregoing bad defect repairing ability in conventional liquid crystal display (LCD) panel, it is an object of the invention to provide an LCD element with good defect repairing ability and the corresponding defect repairing method capable of repairing line defects and point defects due to broken circuits and short circuits, respectively.

To repair the line defects, the invention provides a circuit design of a single pixel having multiple scan lines and multiple data lines, with separate spare lines installed between. When a broken circuit occurs to any data line or scan line, the spare line is electrically welded to connect to the broken circuit, thereby forming the shortest connection path. This can minimize the signal attenuation due to long wiring and is suitable for multiple line defect repairs.

To repair point defects, the invention provides a circuit design of a single pixel having multiple subpixel electrodes, with spare conduction ports installed between. With the application of welding and connecting joints, the defective electrode can be readily separated once any subpixel has a defect. The spare conduction port for connection is melted for connection, and the resource of other subpixels will be used to support and compensate for the defective subpixel in an attempt to decrease the loss in screen image signals.

BRIEF DESCRIPTION OF THE DRAWINGS

The present invention will make a specific demonstration in virtue of the detailed description along with the figures given below.

DETAILED DESCRIPTION OF THE INVENTION

The present invention provides a liquid crystal display (LCD) element with a defect repairing function. The invention also proposes a repairing method for line defects and point defects. As this invention adopts the design of multiple data lines and multiple scan lines assisted with the installation of spare lines, line defects due to broken circuits can be easily repaired. Furthermore, as each display pixel forms multiple subpixels by using multiple electrode plates and with the connection of multiple signal lines and the installation of spare conduction ports, point defects due to short circuits in pixel electrodes or control transistors can be repaired. So the present invention can greatly increase the quality and yield of the LCD elements. The invention utilizes many widely known circuit elements and manufacturing techniques in the prior art, such as field effect transistor (FET) manufacturing processes and wire melting and connecting technologies which will not be further described hereinafter.

Figure 3:
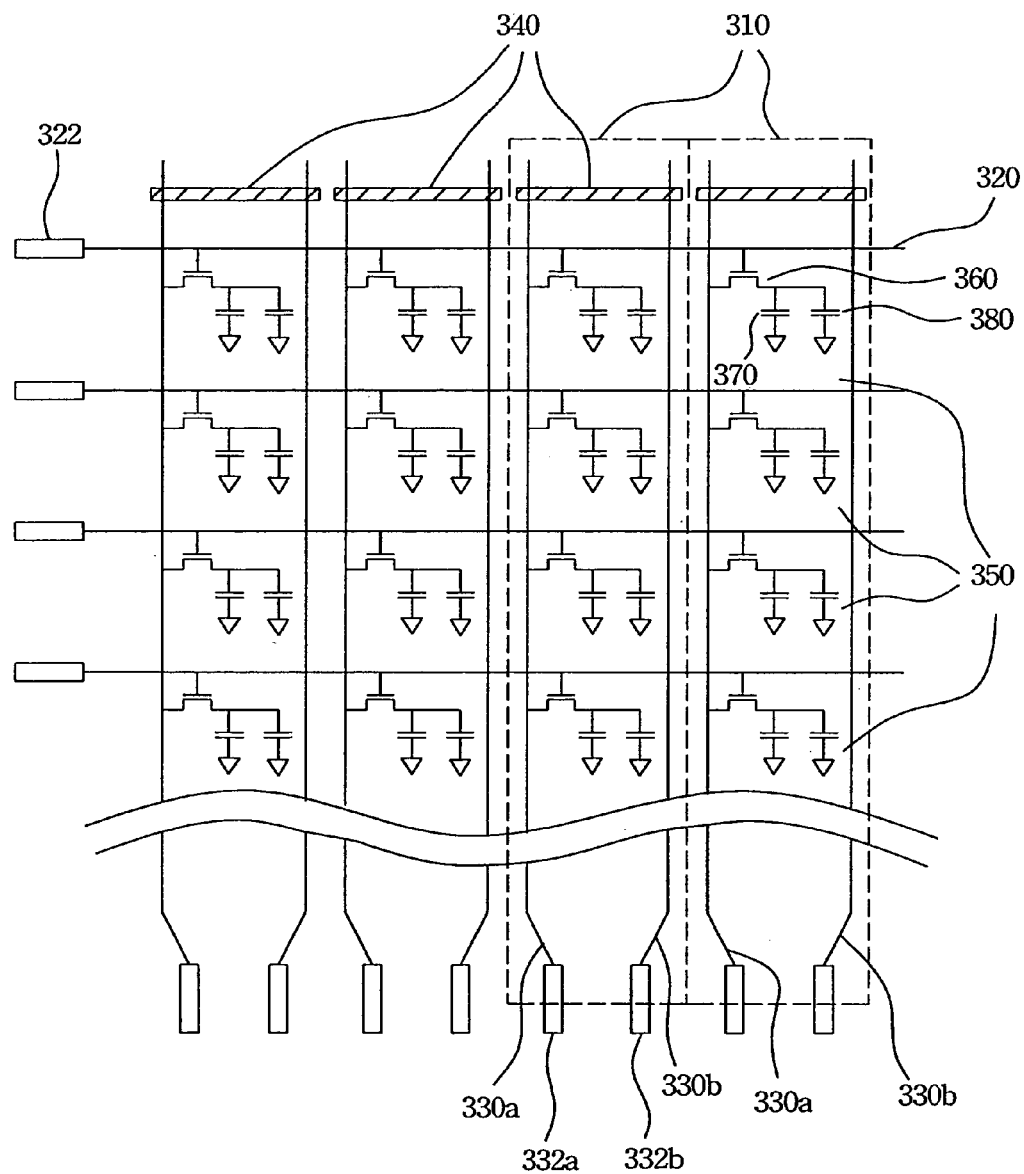
FIG. 3 is an array circuit layout of an LCD element with multiple data lines according to a first embodiment of the invention.

With reference to FIG. 3, the circuit adopts a multiple data line configuration that uses more than one data line to provide display control signals to the same pixel. In this embodiment, the LCD element is composed of a plurality of parallel optical display rows 310 and a plurality of scan lines 320 orthogonal to each optical display row 310. One terminal of each scan line connects to a source pad 322a, 322b for signal input.

Figure 1A:
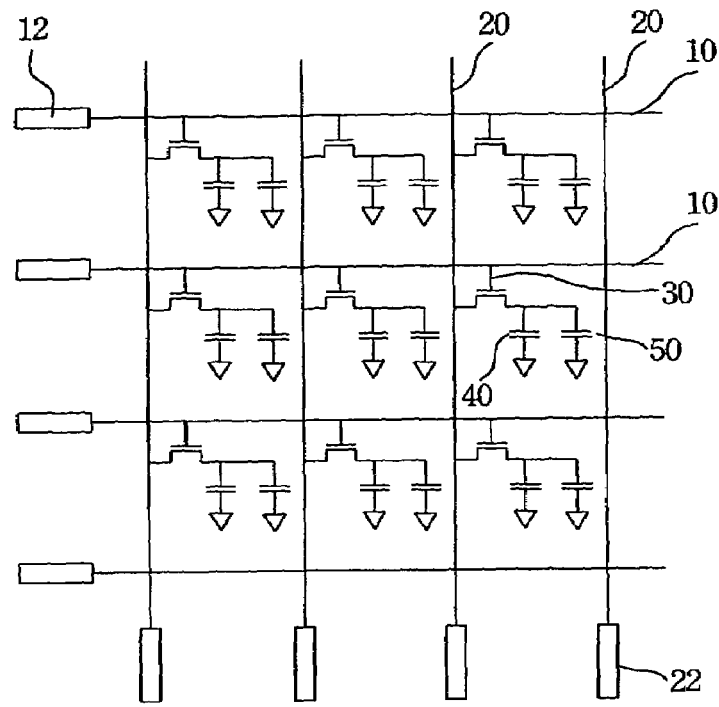
FIG. 1A shows the array circuit layout of a conventional LCD element.
Figure 2A:
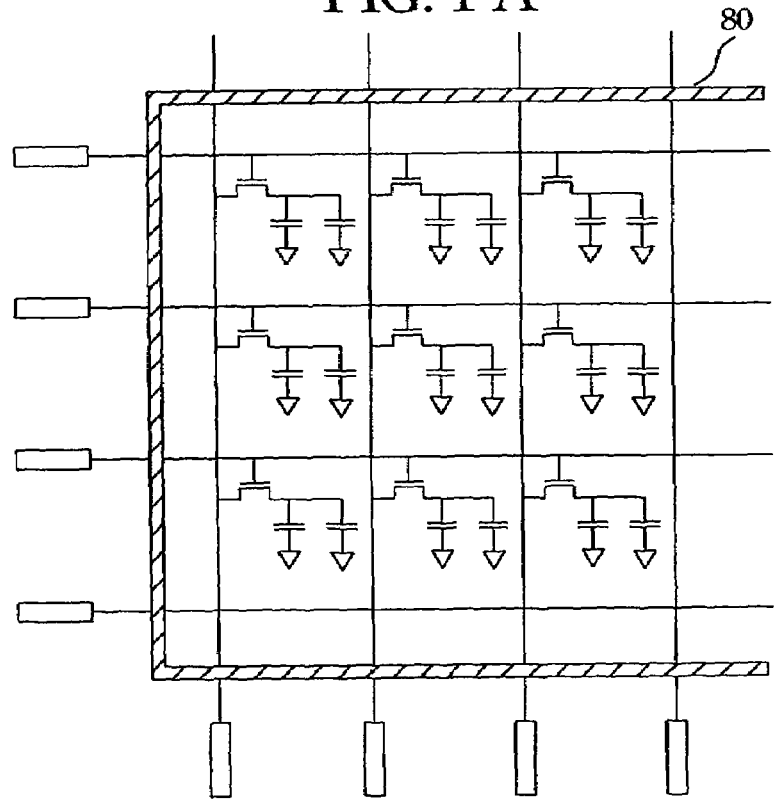
FIG. 2A shows the array circuit layout of a conventional LCD element that has spare data lines.
Figure 1B:
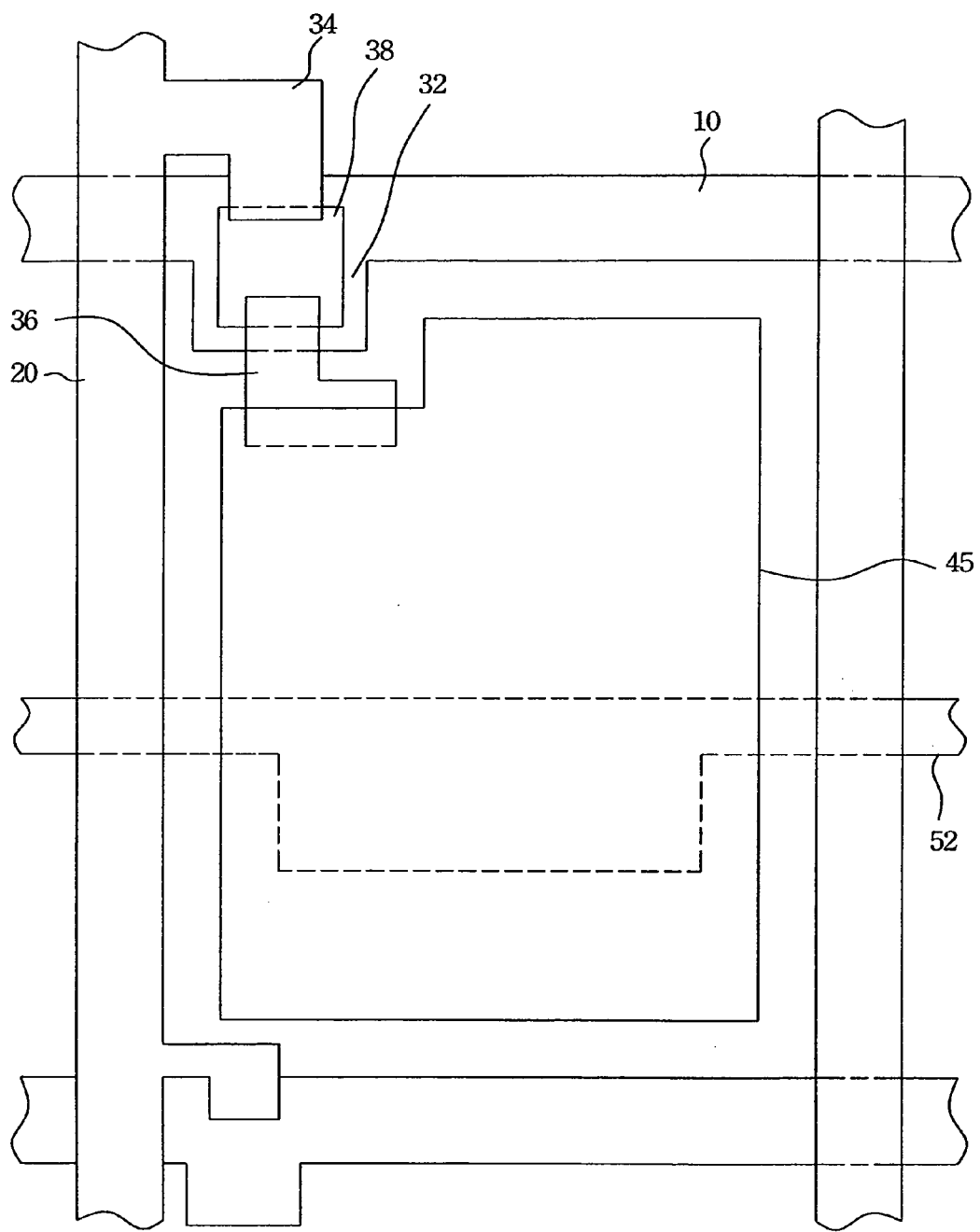
FIG. 1B shows the pixel layout of a conventional LCD element.
Figure 2:
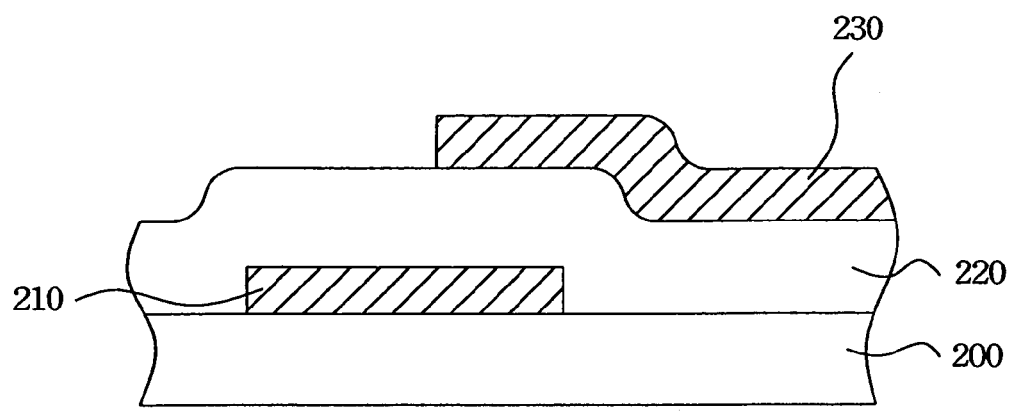
FIGS. 2B and 2C shows a schematic cross-sectional view of the spare data line configuration and welding in a conventional LCD element.
Figure 2:
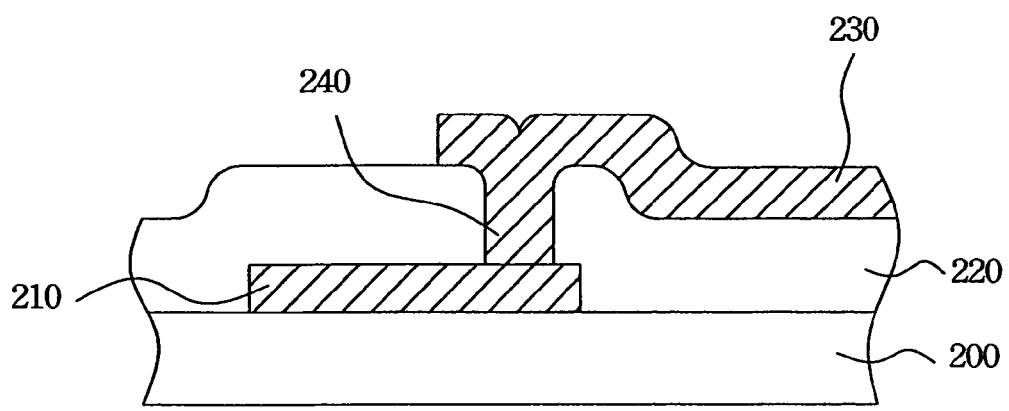

Each optical display row 310 has at least two correlation data lines 330a, 330b with one terminal connecting to source pads 332a, 332b for signal input, respectively. They are also orthogonal to the scan lines 320. A spare line 340 is provided between the two correlation data lines 330a, 330b. The spare lines for different display rows are allocated separately without connection to each other. In a preferred embodiment, the spare line 340 is installed between the terminals of the correlation data lines 330a, 330b near the border of the display element. The spare line 340 of each optical display row 310 is floating above the two correlation data lines 330a, 330b so that it can be melted for connection. In this embodiment, the configuration can be achieved by overlapping and isolation, as shown in FIG. 2B.

Each optical display row 310 is separated into a series of pixels 350 by orthogonal scan lines 320. Each pixel 350 corresponds to a scan line 320 and two correlation data lines 330a, 330b. In the first embodiment, each pixel 350 comprises a field effect transistor (FET) 360, a liquid crystal capacitor 370, and a storage capacitor 380. Each FET 360 has a gate, a drain, and a source, wherein the gate connects to the corresponding scan line 320 and the drain connects to either data line 330a or 330b in the same optical display row 310. The liquid crystal capacitor 370 and the storage capacitor 380 are connected in parallel between the drain and ground of the FET 360.

Figure 4:
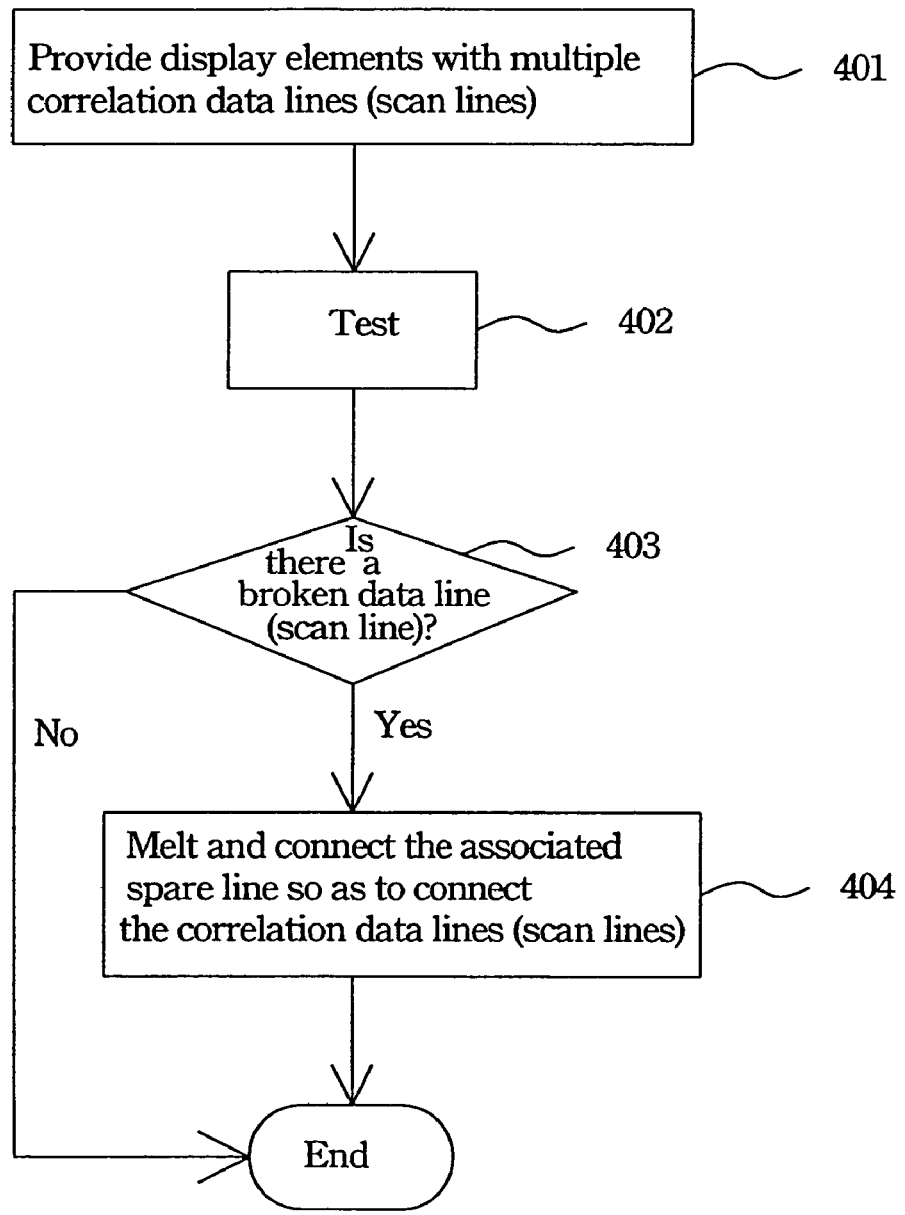
FIG. 4 is a flowchart showing the signal line defect test and repairing according to the first embodiment LCD element circuit.

Using a circuit composed of the LCD element according to the first embodiment, the defects in the LCD element caused by broken data lines can be easily repaired. With reference to FIG. 4, the display element mentioned in the first embodiment is provided in step 401. The display element is provided with multiple correlation data lines 330a and 330b with spare lines 340 installed between. When the elementary manufacturing process for the display element is finished, all spare lines 340 and correlation data lines 330a, 330b are isolated from each other before defect tests and repairs.

Afterwards, each gate pad 322 and source pad 332a, 332b sends control signals to perform tests (step 402) and (step 403). If any line defect caused by broken data lines is found in the test process, repairing can be carried out immediately (step 404). The repairing focuses on the broken data line. The intervening areas between the separated spare line 340 and the corresponding two correlation data lines 330a, 330b are welded so that the broken data line and the correlation data lines 330a, 330b are electrically connected through the spare line 340. Therefore, the data line that has an open circuit with the source pads 332a, 332b due to broken lines will connect to the corresponding source pads 332a, 332b via the correlation data lines 330a, 330b and the spare line 340. Once the defect is repaired, the source pads 332a, 332b of each set of correlation data lines in the display element are coupled to the same signal input terminal. Thus, the original broken data line will receive the same control signals of data line through the correlation data lines achieving predetermined display effects and the goals of repairing defects as well as increasing element quality and the manufacturing yield.

Figure 5:
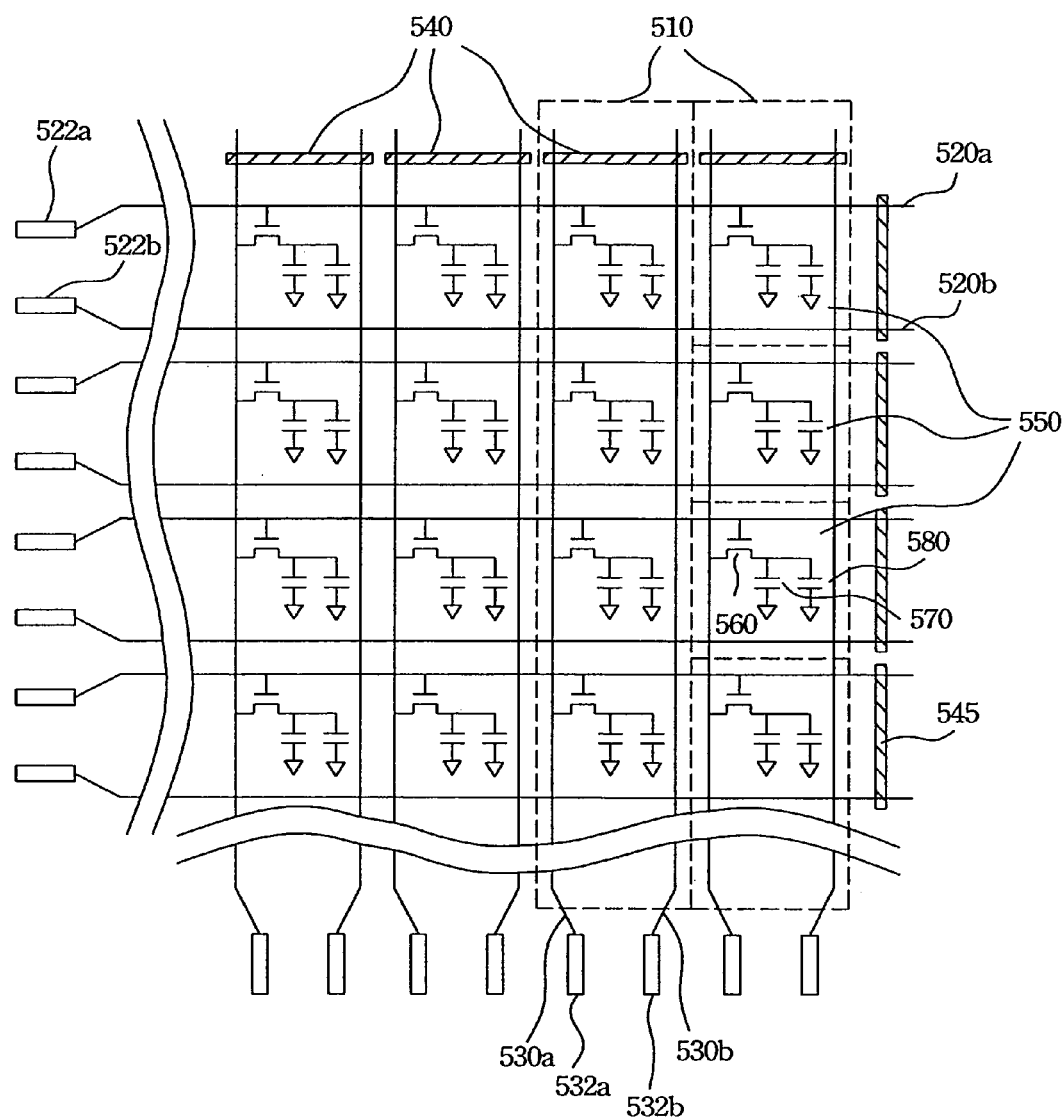
FIG. 5 is an array circuit layout of an LCD element with multiple data lines and multiple scan lines according to a second embodiment of the invention.

Referring to FIG. 5, the configuration of multiple data lines and multiple scan lines is adopted in the second embodiment. More than one data line and more than one scan line provide display control signals to the same pixel. In the current embodiment, the LCD element is composed of a plurality of parallel optical display rows 510 and a plurality of pairs of correlation scan lines 520a, 520b, orthogonal to each optical display row 510. One terminal of each scan line connects to a gate pad 522a or 522b as signal input terminal.

Each optical display row 510 contains at least two correlation data lines 530a and 530b, with the source pads 532a and 532b installed at the terminals thereof as signal input terminals. A data spare line 540 is disposed between two correlation data lines 530a and 530b. In a preferred embodiment, the data spare line 540 is installed at the terminals of the two correlation data lines 530a and 530b near the display element border. The data spare line 540 of each optical display row 510 is electrically floating over the terminals thereof so that it can be melted. This configuration can be achieved by the aforesaid overlapping and separating method. Furthermore, a scan spare line 545 is floating between each pair of correlation scan lines 520a, 520b near the terminals thereof. The data spare lines 540 between different optical display rows 510 and the scan spare lines 545 between different sets of correlation scan lines 520a, 520b are installed separately without connection to each other.

Each optical display row 510 is divided into a series of pixels 550 by orthogonal correlation scan lines 520a and 520b. Each pixel corresponds to a pair of correlation scan lines 520a, 520b and two correlation data lines 530a, 530b. In the second embodiment, each pixel 550 includes an FET 560, a liquid crystal capacitor 570 and a storage capacitor 580, similar to the first embodiment. Each FET 560 has a gate, a drain, and a source, wherein the gate connects to any of the corresponding scan lines 520a, 520b, the source connects to any of the data lines 530a, 530b in the same optical display row 510. The liquid crystal capacitor 570 and the storage capacitor 580 are connected in parallel between the drain and the ground of the FET 560.

Using a circuit composed of the LCD element in the second embodiment, defects caused by broken data lines or scan lines in the LCD element can be simultaneously repaired. All test and repairing procedures are the same as in FIG. 4 as long as the display elements mentioned in the second embodiment is provided and the repairing procedure for data lines is utilized identically to the broken scan lines. Before performing defect tests and repairing, all data spare lines 540 and correlation data lines 530a, 530b, as well as the scan spare lines 545 and correlation scan lines 520a, 520b, are isolated from one another. After the repairing is complete, the originally broken data line or scan line will connect to the associated data line or scan line through the spare line, respectively. The source pads of each set of the correlation data lines and the gate pads of each set of the correlation scan lines are then coupled to the same signal input terminal, respectively, to receive the same control signals, thus achieving expected display effects.

Figure 6A:
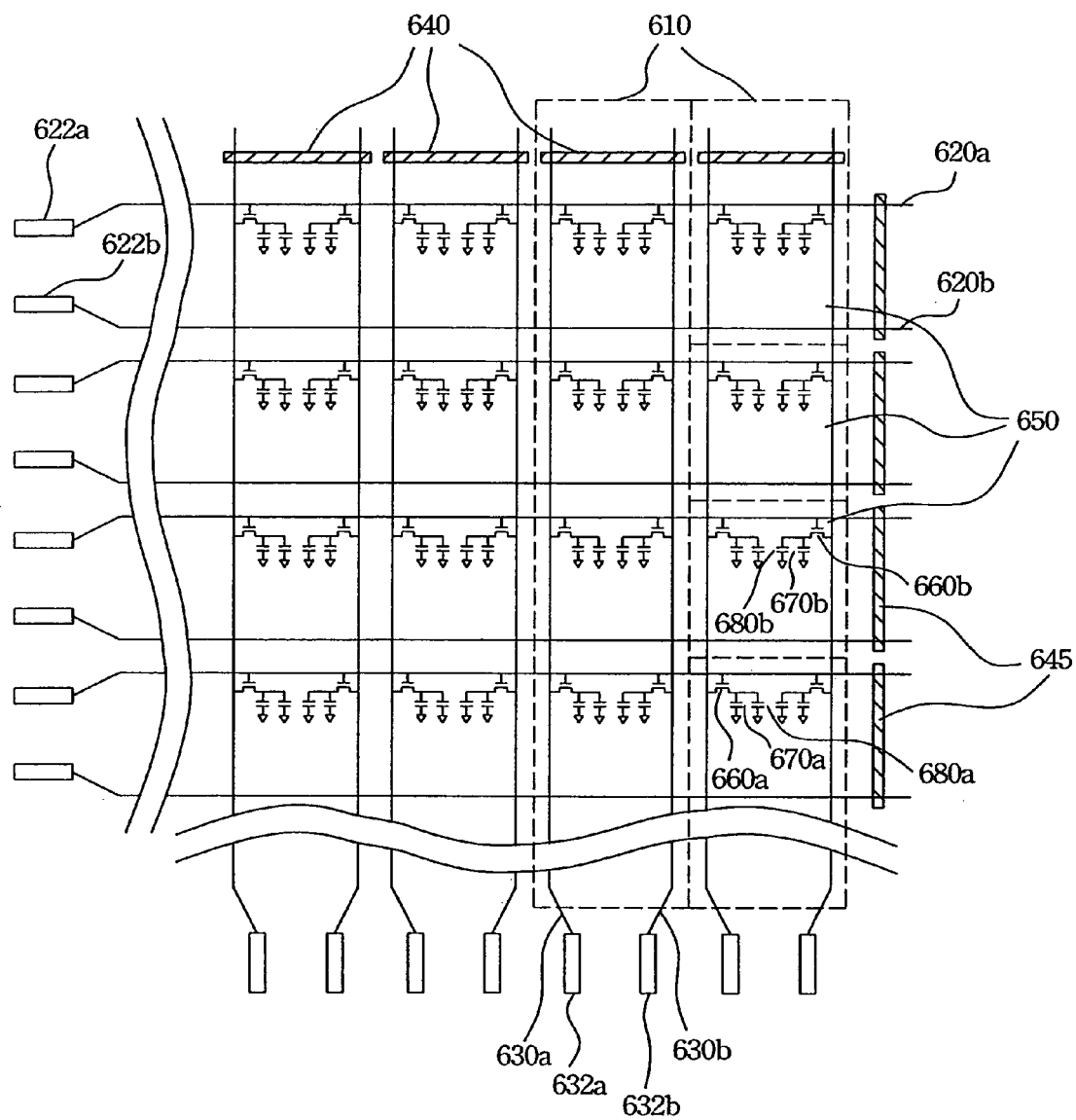
FIG. 6A is an array circuit layout of an LCD element with two subpixels according to a third embodiment of the invention.
Figure 6:
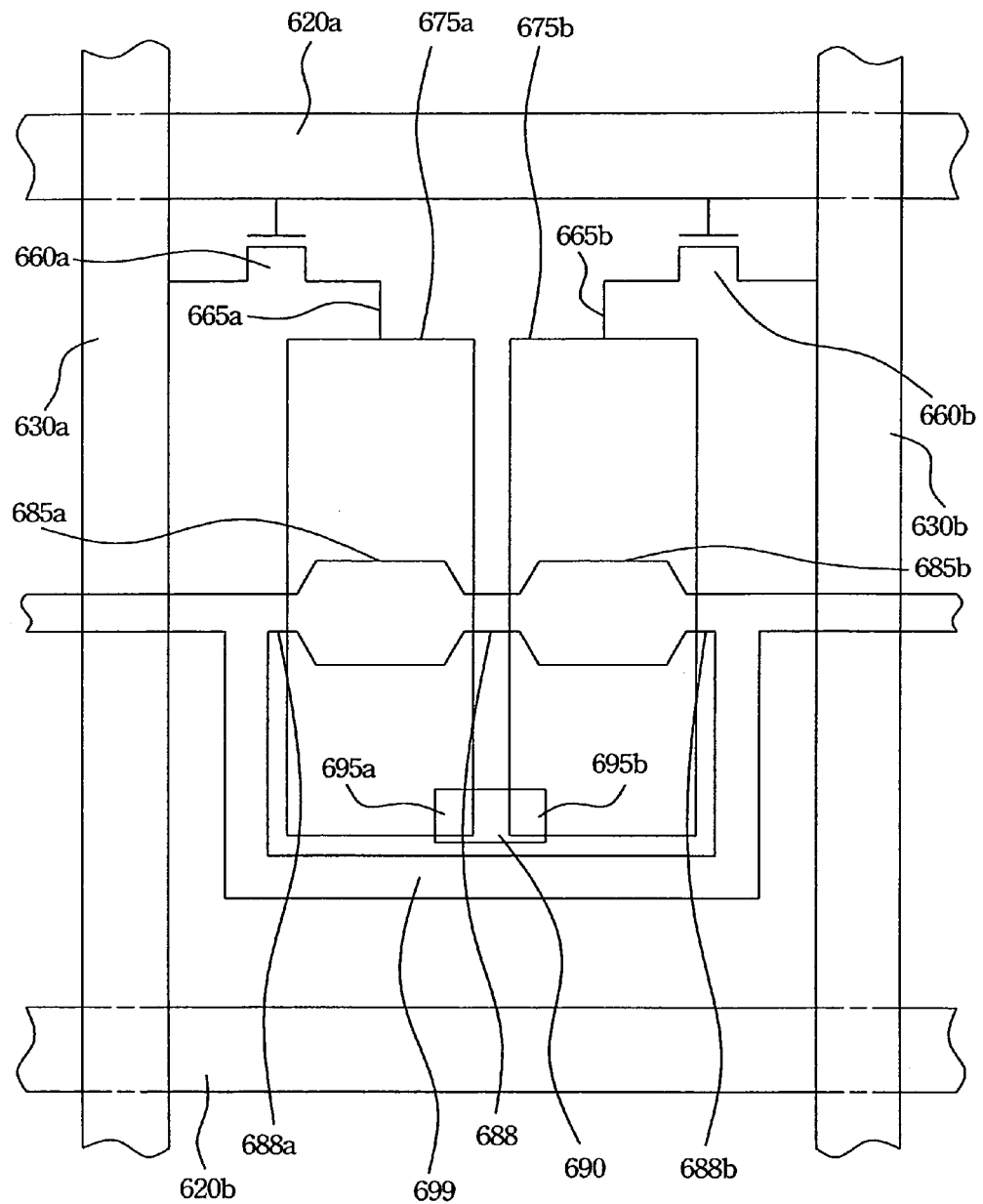
FIG. 6B is a pixel layout of the LCD element with two subpixels according to the third embodiment of the invention.

The repairing circuit and technologies for point defects is further described in the following embodiments. With reference to FIG. 6A for the third embodiment of the disclosed LCD element, a two-subpixel configuration is adopted in addition to the multiple data lines and multiple scan lines. Two subpixel electrodes receive the same control signals and generate the same display signals to form a complete LCD pixel. In this embodiment, the LCD element is composed of a plurality of parallel optical display rows 610 and a plurality of pairs of correlation scan lines 620a, 620b that are orthogonal to each optical display row 610. One terminal of each scan line 620a, 620b connects to gate pad 622a or 622b as signal input terminal.

Each optical display row 610 contains at least two correlation data lines 630a, 630b, with the source pads 632a, 632b installed at the terminals thereof as signal input terminals. The two correlation data lines 630a, 630b are also orthogonal to the scan lines 620a, 620b. A data spare line 640 is situated between the two correlation data lines 630a, 630b, preferably at the terminals thereof near the display element border. A scan spare line 645 between each pair of correlation scan lines 620a, 620b is also provided. The scan spare line 645 is also preferably installed at the terminals of the correlation scan lines 620a, 620b near the display element border. The data spare line 640 and the scan spare line 645 are electrically floating and can be welded. The data spare lines 640 between different optical display rows 610, as well as the scan spare lines 645 between different sets of correlation scan lines 620a, 620b, are installed separately without connection to each other.

Each optical display row 610 is divided into a series of pixels 650 by orthogonal correlation scan lines 620a, 620b. Each pixel corresponds to a pair of correlation scan lines 620a, 620b and two correlation data lines 630a, 630b. In the third embodiment, each pixel 650 includes two FETs 660a, 660b, two liquid crystal capacitors 670a, 670b, and two storage capacitors 680a, 680b. The FET 660a, the liquid crystal capacitor 670a, and the storage capacitor 680a form one subpixel; the FET 660b, the liquid crystal capacitor 670b, and the storage capacitor 680b form another subpixel. Each FET 660a, 660b has a gate, a drain, and a source, wherein the two gates connect to any of the corresponding scan lines 620a, 620b respectively or together, the two sources connect to any of the correlation data lines 630a, 630b of the same optical display row 610 respectively or together. In the embodiment as shown in FIG. 6A, the two gates connect to the same scan line 620a, the two sources connect to the different data lines 630a and 630b. The liquid crystal capacitor 670a and the storage capacitor 680a are connected in parallel between the drain and the ground of the FET 660a; the liquid crystal capacitor 670b and the storage capacitor 680b are connected in parallel between the drain and the ground of the FET 660b.

In other embodiments related to two-subpixel, each pixel can be associated with a single scan line and two correlation data lines or, alternatively, each pixel is associated with a single data line and two correlation scan lines. Each subpixel in the former case corresponds to a distinct data line and the same scan line. Each subpixel in the later case corresponds to a distinct scan line and the same data line.

Please refer to FIG. 6B for a pixel layout of the disclosed LCD element in the third embodiment. Since the layout of the FETs 660a, 660b are not the feature of the invention, they are referred to as element symbols. The disclosed design of multiple data line and/or multiple scan line configuration or the multiple subpixel configuration described hereinafter, regardless of the deployment of FETs 660a, 660b, are within the scope of the present invention.

As shown in FIG. 6B, the third embodiment of the pixel layout contains two transparent electrode plates 675a, 675b, respectively connecting to the drains of FETs 660a, 660b. The transparent electrode plate 675a serves as the electrode of the liquid crystal capacitor 670a and the storage capacitor 680a, and the transparent electrode plate 675b is used as the other electrode of the liquid crystal capacitor 670b and the storage capacitor 680b. A spare conduction port 690 is electrically floating over the two transparent electrode plates 675a, 675b with the overlapping areas 695a, 695b. In addition, the spare conduction ports 690 of different pixels are not connected to each other.

The liquid crystal pixel has an electrode plate 685a, 685b isolating from the transparent electrode plates 675a, 675b by a dielectric layer (not shown) to form storage capacitors 680a, 680b. Since each storage electrode plate 685a, 685b in all pixels need to ground, all the storage electrode plates are connected to each other through a conductive wire. In the same pixel, the storage electrode plates 685a, 685b are electrically connected to each other through a connection port 688. Both ends of the storage electrode plates 685a, 685b are connected via a spare connection wire 699 to form an auxiliary pathway. The spare connection wire 699 and the storage electrode plates 685a, 685b are coupled through the connection ports 688a, 688b., respectively. In the above layout, the connection ports 688, 688a, 688b, the joint 665a between the transparent electrode plate 675a and the drain of the FET 660a, and the joint 665b between the transparent electrode plate 675b and the drain of the FET 660b can all be welded.

Figure 7:
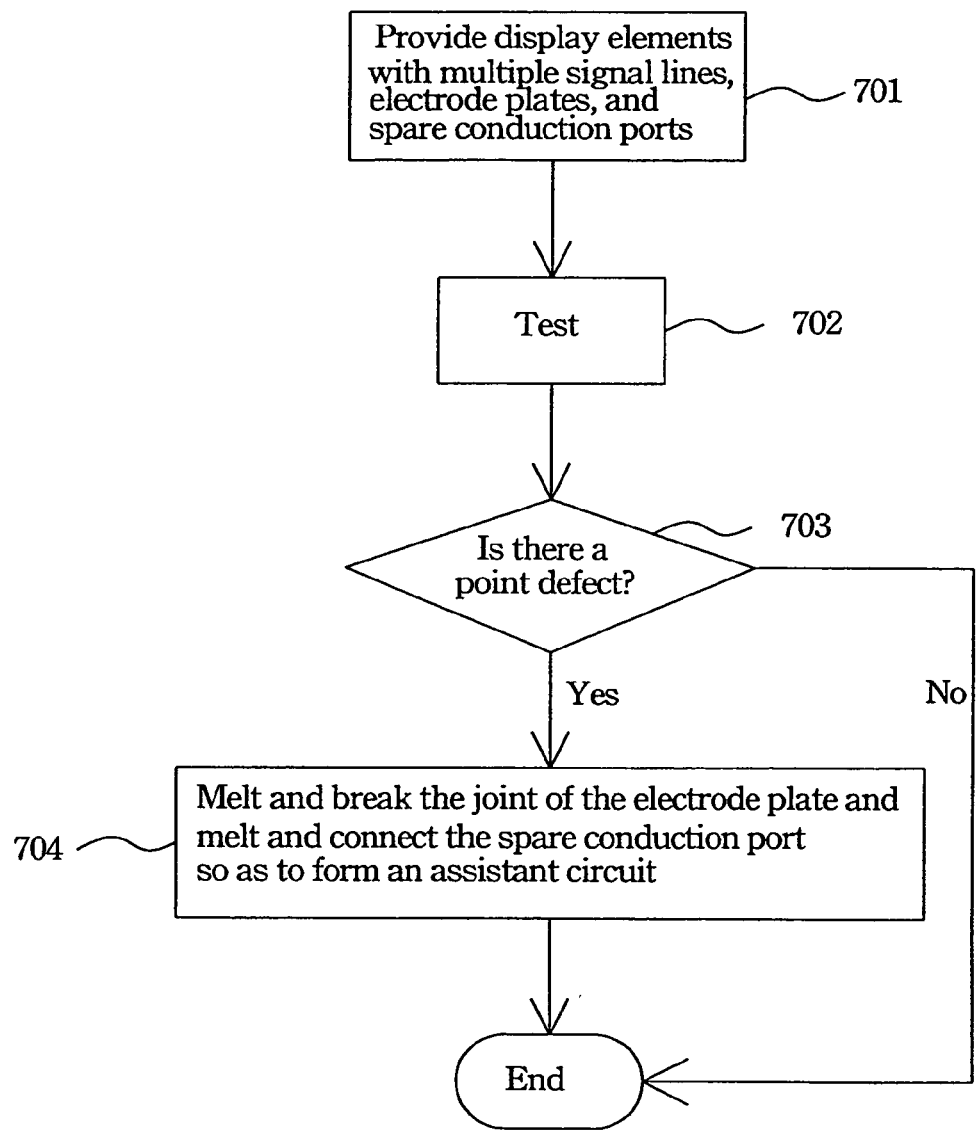
FIG. 7 is a flowchart showing the signal line defect test and repairing according to the third embodiment LCD element circuit.

Using a circuit composed of the LCD elements in the third embodiment, line defects of the LCD elements and points defects caused by FET failures or short circuits in the transparent electrode plates can be readily repaired. The repairing procedure for line defects is as shown in FIG. 4 and the related description. The procedure for the point defect tests and repairing of the transparent electrode plates is shown in FIG. 7. In the course of repairing, the display elements mentioned in the third embodiment are provided (step 701) at first. The display element has to include multiple subpixels, subpixel electrodes 675a, 675b, and spare conduction ports 690 provided in between. The spare conduction port 690 and the two electrode plates 675a, 675b are disconnected before the defect tests and repairing.

Afterwards, each gate pad 622a, 622b and source pad 632a, 632b inputs control signals to perform tests (step 702) such that any failure in the electrode plate 675a or 675b (step 703) can be diagnosed. If any point defect caused by electrode plate failure is found in the display element during the test process, repairs can be performed right away (step 704). The repairing is performed on the pixel with failed electrode plate, and the failed portion needs to be isolated. When the FET fails, the joint 665a or 665b between the electrode plate 675a, 675b and the FET drain is cut. When a short circuit between the electrode plate 675a, 675b and the corresponding storage electrode plate 685a, 685b occurs, the corresponding connection port 688 and 688a or 688b is cut. If the problem is unable to locate, the failed electrode plate and the FET, and the storage electrode plate 685a, 685b and the ground terminal are disconnected simultaneously.

Once the failed portion of the pixel is isolated, the overlapping area between the spare conduction port 690 and the two electrode plates 675a, 675b is welded so that the two electrode plates 675a and 675b of the failed pixel are connected through the conduction port 690, forming a new coupled circuit. Therefore, the originally failed electrode plate connects to another FET drain through the spare conduction port 690 and another electrode plate. After the defect is repaired, the source pads 632a, 632b of each set of correlation data lines in the display element are coupled to the same signal input terminal, the gate pads 622a, 622b of each set of correlation scan lines also are coupled to the same signal input terminal. In a regular pixel, two FETs are used to drive two liquid crystal capacitors and two storage capacitors. In the defect-repairing pixel, however, one FET is used to drive two liquid crystal capacitors and one storage capacitor. The originally failed electrode plate will be charged and driven by the corresponding FET of another electrode plate to a predetermined voltage through the connection of the spare conduction port 690. By this method, it can attain the expected display effect and the goal of repairing defects and enhancing element quality and yield.

Figure 8:
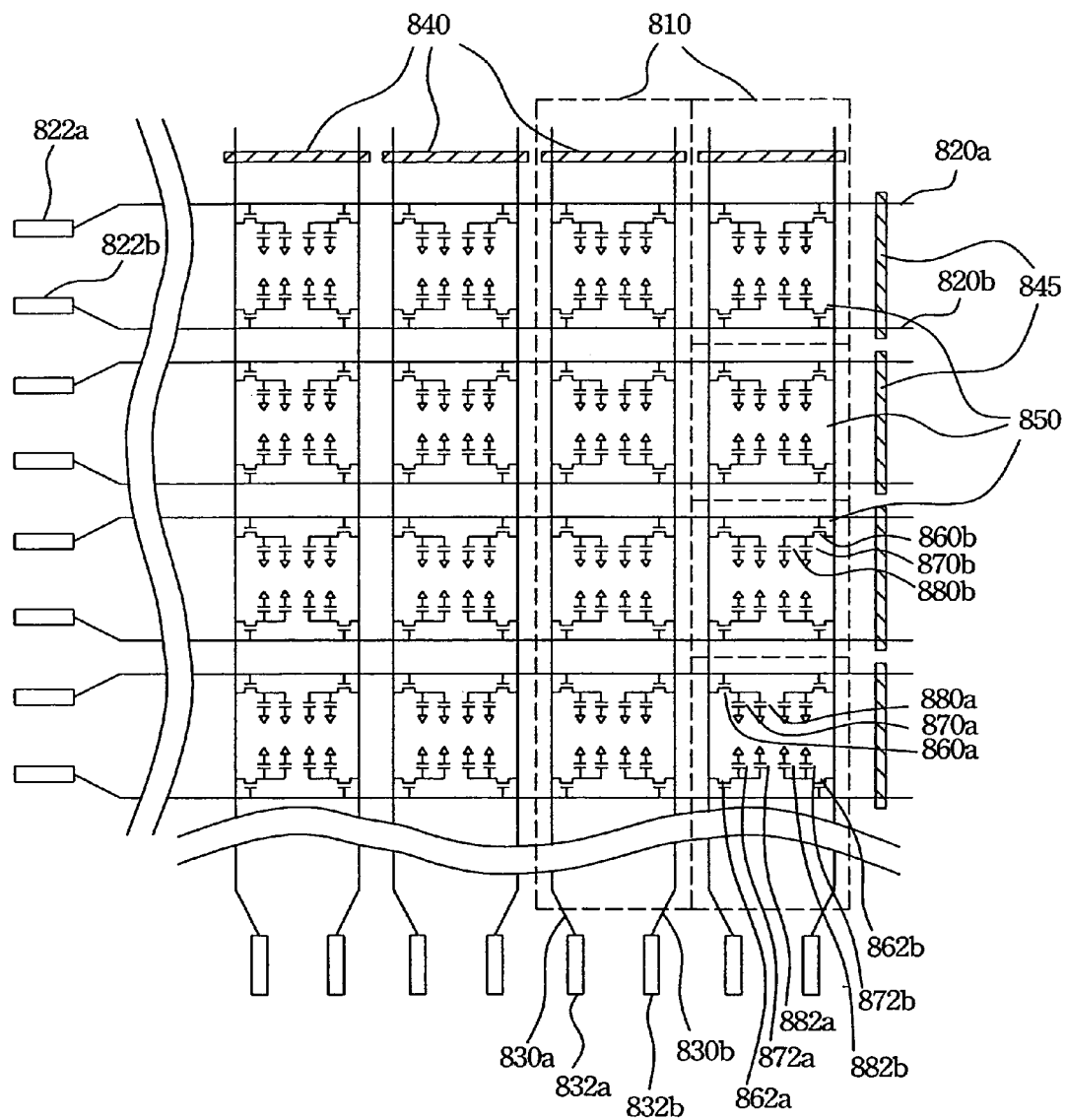
FIG. 8A is an array circuit layout of an LCD element with four subpixels according to a third embodiment of the invention.
FIG. 8B is a pixel layout of the LCD element with four subpixels according to the third embodiment of the invention.
Figure 8:
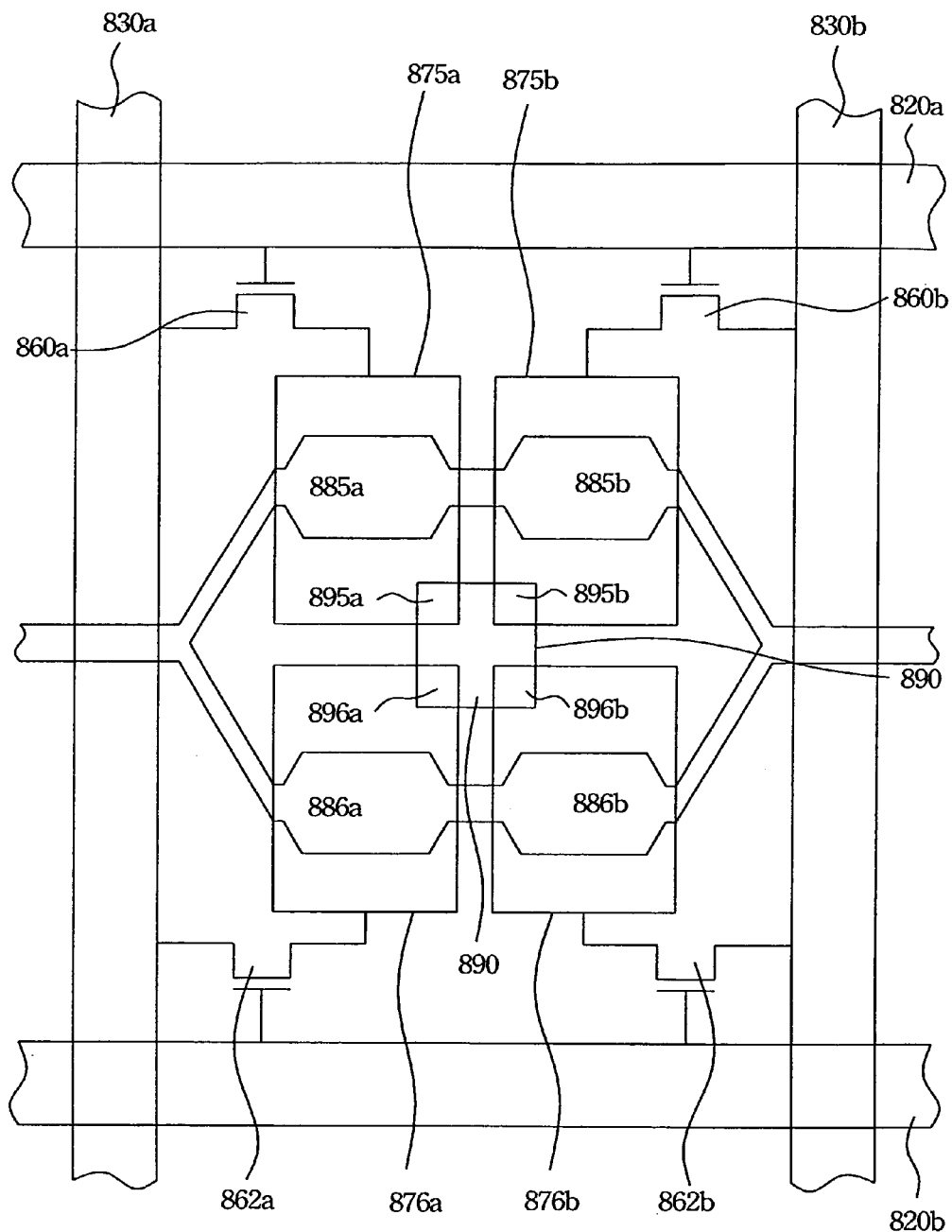

FIG. 8A shows circuit configuration of the LCD element in the fourth embodiment. In addition to the above-mentioned multiple data lines and multiple scan lines, a four subpixel configuration is further adopted such that the four subpixel electrodes receive the same control signals and generate the same display signals, forming a complete LCD pixel. In this embodiment, the LCD element is composed of a plurality of parallel optical display row 810 and a plurality of correlation scan line pairs 820a, 820b disposed orthogonal to each optical display row 810, respectively. The gate pads 822a, 822b are installed at the terminals of each scan line pair 820a, 820b as signal input terminals.

Each optical display row 810 contains at least two correlation data lines 830a, 830b with the source pads 832a, 832b installed at the terminals thereof as signal input terminals. The correlation data lines 830a, 830b are also orthogonal to the scan lines 820a, 820b. A data spare line 840 is provided between the two correlation data lines 830a, 830b whose location is preferably at the terminals of the two correlation data lines 830a, 830b near the display element border. A scan spare line 845 is also provided between each pair of the correlation scan lines 820a, 820b, which is also preferably installed at the terminals of the two correlation scan lines 820a, 820b near the display element border. Each data spare line 840 and the scan spare lines 845 are allocated separately without connection to each other.

Each optical display row 810 is separated into a series of pixels 850 by orthogonal correlation scan line pairs 820a and 820b. Each pixel corresponds to a pair of correlation scan lines 820a, 820b and two correlation data lines 830a, 830b. In the fourth embodiment, each pixel 850 has four FETs 860a, 860b, 862a, 862b, four liquid crystal capacitors 870a, 870b, 872a, 872b, and four storage capacitors 880a, 880b, 882a, 882b, totally forming four subpixels. Each FET has a gate, a drain, and a source, wherein the gates of the FETs 860a, 860b connect to the same scan lines 820a, and the gates of the FETs 862a, 862b connect to the same scan lines 820b. The sources of the FETs 860a, 862a connect to the same data line 830a of the optical display row 810. The sources of the FETs 860b, 862b connect to the same data line 830b of the optical display row 810. The liquid crystal capacitor 870a and the storage capacitor 880a are connected in parallel between the drain and the ground of the FET 860a; the liquid crystal capacitor 870b and the storage capacitor 880b in parallel between the drain and the ground of the FET 860b; the liquid crystal capacitor 872b and the storage capacitor 882b in parallel between the drain and the ground of the FET 862b; and the liquid crystal capacitor 872b and the storage capacitor 882b in parallel between the drain and the ground of the FET 862b.

With reference to FIG. 8B, the FETs 860a, 860b, 862a, 862b are referred to by element symbols since they are not the features of the invention. The previously disclosed design of multiple data lines and/or multiple scan lines with multiple subpixels, despite of the deposition of the FETs 860a, 860b, 862a, 862b, are within the scope of the invention.

As shown in FIG. 8B, the pixel layout has four transparent electrode plates 875a, 875b, 876a, 876b connecting to the drains of the FETs 860a, 860b, 862a, 862b, respectively. The transparent electrode plate 875a serves as the electrode of the liquid crystal capacitor 870a and the storage capacitor 880a; the transparent electrode plate 875b is used as the electrode of the liquid crystal capacitor 870b and the storage capacitor 880b; the transparent electrode plate 876a serves as the electrode of the liquid crystal capacitor 872a and the storage capacitor 882a; and the transparent electrode plate 876b is used as a electrode of the liquid crystal capacitor 872b and the storage capacitor 882b.

A spare conduction port 890 is partially overlapping and floating over the four transparent electrode plates 875a, 875b, 876a, 876b. The overlapping areas include 895a, 895b, 896a and 896b. Spare conduction ports 890 of different pixels are not connected.

The liquid crystal pixel has the storage electrode plates 885a, 885b, 886a, 886b overlapping but isolated from the transparent electrode plates 875a, 875b, 876a, 876b by a dielectric layer (not shown), forming the storage capacitors 880a, 880b, 882a, 882b. Each storage electrode plate in all pixels is connected by a conductive wire and coupled to the ground. In the above layout, all connection ports among the storage electrode plates and the joints between the transparent electrode plates and the FET drains are meltable.

Using a circuit composed of the LCD elements in the fourth embodiment, repair line defects or point defects because of electrode plate short circuits or FET failure can be easily repaired. The line defect repairing procedure is shown in FIG. 4 and the related description, the point defect test and repairing procedure is shown in FIG. 7. Before performing defect tests and repairing, the spare conduction port 890 and all electrode plates 875a, 875b, 876a, 876b are separated and not connected. When any electrode plate of the pixel is found to be defective, the electrode plate and the corresponding storage capacitor are separated from the corresponding transistor and ground, and the spare conduction port 890 and all the electrode plates 875a, 875b, 876a, 876b are melted and electrically connected. After repairing, the good pixel uses four FETs to drive four liquid crystal capacitors and four storage capacitors, whereas the repaired defective pixel uses three FETs to drive four liquid crystal capacitors and three storage capacitors. Through the spare conduction port 890, the originally defective electrode plate is charged by the transistors of the other three electrode plates a predetermined voltage. This can then achieve expected display results, repair defects and increase the element quality and yield.

In summary, the invention uses a circuit design of a single pixel associated with multiple scan lines and multiple data lines for repairing line defects. Between the multiple scan lines and multiple data lines of the same pixel, a separated spare line is provided to melt and connect the data lines or scan lines of the broken circuit, forming the shortest connection path. This can minimize the transmission distance, stray capacitance, and signal attenuation. This method is also applicable to multiple line defect repairs. Furthermore, the invention provides a circuit design of a single pixel associated with a plurality of subpixels for repairing point defects. A spare conduction port is provided between the subpixel electrodes of the same pixel. Through the utilization of meltable joints and the connection with multiple signal lines, the defective electrode at any pixel can be isolated and the spare conduction port can be melted for connection. By exercising the resource of other subpixels to support and compensate the defective subpixel, the screen quality of the entire pixel can be maintained, thereby minimizing the loss in screen signals.

The scope of this invention is not limited to the above description with reference to specific embodiments. Various modifications of the disclosed embodiments, as well as alternative embodiments, will be apparent to persons skilled in the art. For example, one can use more than two corre-lation scan lines and/or data lines on the same pixel. One can also use a spare line to selectively connect all correlation scan lines or data lines. Alternatively, one can use dividable spare lines so that the correlation scan lines or data lines can be selectively connected to each other. The spare conduction port can have a similar design. A plurality of spare conduction ports can be selectively connected between the subpixel electrode plates. At this moment, each pixel electrode plate corresponds to at least one spare conduction port and each spare conduction port corresponds to at least two subpixel electrode plates. The correspondence of the spare lines can use the similar pattern. It is, therefore, contemplated that the appended claims will cover all modifications that fall within the true scope of the invention.

The invention claimed is:

1. A liquid crystal display (LCD) element with a defect repairing function, said LCD element comprising:
   a plurality of parallel scan lines; and
   a plurality of optical display rows disposed orthogonal to the plurality of scan lines;
   wherein each of the optical display rows at least includes;
   two data lines, orthogonal to the plurality of scan lines; and
   a plurality of display pixels, each display pixel corresponding to at least one of the scan lines;
   wherein each of the display pixels includes:
   at least two field effect transistors (FETs) each having a gate, a drain, and a source, each of said FETs corresponding to one of the data lines, wherein the gates of the FETs are connected to said at least one scan line and the source of each FET is connected to the corresponding data line;
   at least two transparent electrodes each corresponding to one of the FETs and being connected to the drain of said corresponding FET;
   a spare conduction port installed between said at least two transparent electrodes for selectively connecting the transparent electrodes, wherein the spare conduction port is electrically isolated from and overlaps said transparent electrodes; and
   more than one storage electrodes each corresponding to one of the transparent electrodes, a dielectric layer being positioned between each of said storage electrodes and the corresponding transparent electrode to define a storage capacitor;
   wherein the storage electrodes of different said display pixels are electrically connected by wires; and
   wherein adjacent said storage electrodes are electrically connected by at least two separate current paths including a connection port and a spare connection wire.

2. The LCD element of claim 1, wherein said connection port connects adjacent ends of said adjacent storage electrodes and said spare connection wire connects distal ends of said adjacent storage electrodes.

3. A liquid crystal display (LCD) element with a defect repairing function, said LCD element comprising:
   a plurality of parallel scan lines; and
   a plurality of optical display rows disposed orthogonal to the plurality of scan lines;
   wherein each of the optical display rows at least includes;
   two data lines, orthogonal to the plurality of scan lines; and
   a plurality of display pixels, each display pixel corresponding to at least one of the scan lines,
   wherein each of the display pixels includes:
   at least two field effect transistors (FETs) each having a gate, a drain, and a source, each of said FETs corresponding to one of the data lines, wherein the gates of the FETs are connected to said at least one scan line and the source of each FET is connected to the corresponding data line;

at least two transparent electrodes each corresponding to one of the FETs and being connected to the drain of said corresponding FET;

a spare conduction port installed between said at least two transparent electrodes for selectively connecting the transparent electrodes, wherein the spare conduction port is electrically isolated from and overlaps said transparent electrodes; and more than one storage electrodes each corresponding to one of the transparent electrodes, a dielectric layer being positioned between each of said storage electrodes and the corresponding transparent electrode to define a storage capacitor;

wherein the storage electrodes of different said display pixels are electrically connected by wires; and wherein the storage electrodes in each of the display pixels are connected by two separate electrical connections including a connection port and a spare connection wire.

4. The LCD element of claim 3, wherein said connection port connects adjacent ends of said storage electrodes and said spare connection wire connects distal ends of said adjacent storage electrodes;

the distal ends of said storage electrodes being further electrically connected, by wires, to the storage electrodes of the other, adjacent display pixels.

* * * * *